US012075438B2

(12) United States Patent
Papasakellariou

(10) Patent No.: US 12,075,438 B2
(45) Date of Patent: Aug. 27, 2024

(54) MECHANISMS FOR DETERMINATION OF ACKNOWLEDGMENT INFORMATION REPORTS

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 17/650,826

(22) Filed: Feb. 11, 2022

(65) Prior Publication Data

US 2022/0272740 A1 Aug. 25, 2022

Related U.S. Application Data

(60) Provisional application No. 63/152,710, filed on Feb. 23, 2021.

(51) Int. Cl.
*H04W 72/23* (2023.01)
*H04L 1/1812* (2023.01)
(Continued)

(52) U.S. Cl.
CPC .......... *H04W 72/23* (2023.01); *H04L 1/1812* (2013.01); *H04L 5/0053* (2013.01); *H04W 72/0446* (2013.01); *H04W 72/1273* (2013.01)

(58) Field of Classification Search
CPC ............. H04W 72/23; H04W 72/0446; H04W 72/1273; H04L 1/1812; H04L 5/0053;
(Continued)

(56) References Cited

U.S. PATENT DOCUMENTS

2019/0045488 A1* 2/2019 Park ................. H04L 5/0048
2020/0008097 A1    1/2020 Fujishiro et al.
(Continued)

FOREIGN PATENT DOCUMENTS

CN    116711248 A  *  9/2023  ........... H04L 1/1854
EP    3761547 A1      1/2021
(Continued)

OTHER PUBLICATIONS

"5G; NR; Physical channels and modulation (3GPP TS 38.211 version 16.4.0 Release 16)", ETSI TS 138 211 V16.4.0, Jan. 2021, 137 pages.
"5G; NR; Multiplexing and channel coding (3GPP TS 38.212 version 16.4.0 Release 16)", ETSI TS 138 212 V16.4.0, Jan. 2021, 155 pages.
(Continued)

*Primary Examiner* — Mohamed A Kamara

(57) ABSTRACT

Methods and apparatuses for determining acknowledgment information reports. A method for operating a user equipment includes receiving first physical downlink control channels (PDCCHs) providing first downlink control information (DCI) formats associated with a first set of radio network temporary identifiers (RNTIs), and second PDCCHs providing second DCI formats associated with a second set of RNTIs. The method further includes determining first hybrid automatic request acknowledgement (HARQ-ACK) information associated with the first DCI formats, second HARQ-ACK information associated with the second DCI formats, and a physical uplink control channel (PUCCH) resource indicated by a last DCI format from the first DCI formats. The method further includes transmitting a PUCCH using the PUCCH resource. The PUCCH includes the first HARQ-ACK information and the second HARQ-ACK information.

17 Claims, 10 Drawing Sheets

(51) Int. Cl.
*H04L 5/00* (2006.01)
*H04W 72/0446* (2023.01)
*H04W 72/1273* (2023.01)

(58) Field of Classification Search
CPC ... H04L 1/1854; H04L 1/1864; H04L 5/0094; H04L 5/0055; H04L 1/0041; H04L 1/0072
See application file for complete search history.

(56) References Cited

U.S. PATENT DOCUMENTS

| | | | | |
|---|---|---|---|---|
| 2020/0213046 | A1* | 7/2020 | Wang | H04L 1/1861 |
| 2021/0029513 | A1* | 1/2021 | Rico Alvarino | H04W 72/121 |
| 2021/0160013 | A1* | 5/2021 | Kim | H04L 1/1819 |
| 2021/0321446 | A1* | 10/2021 | Lee | H04L 5/0094 |
| 2021/0368541 | A1* | 11/2021 | Hedayat | H04W 72/0446 |

FOREIGN PATENT DOCUMENTS

| | | |
|---|---|---|
| EP | 3910852 A1 | 11/2021 |
| EP | 3982664 A1 | 4/2022 |
| KR | 10-2021-0017949 A | 2/2021 |
| WO | 2020145704 A1 | 7/2020 |
| WO | 2020245973 A1 | 12/2020 |
| WO | 2022027540 A1 | 2/2022 |
| WO | 2023153860 A1 | 8/2023 |

OTHER PUBLICATIONS

"5G; NR; Physical layer procedures for control (3GPP TS 38.213 version 16.4.0 Release 16)", ETSI TS 138 213 V16.4.0, Jan. 2021, 185 pages.
"5G; NR; Physical layer procedures for data (3GPP TS 38.214 version 16.4.0 Release 16)", ETSI TS 138 214 V16.4.0, Jan. 2021, 173 pages.
"5G; NR; Medium Access Control (MAC) protocol specification (3GPP TS 38.321 version 16.3.0 Release 16)", ETSI TS 138 321 V16.3.0, Jan. 2021, 158 pages.
"5G; NR; Radio Resource Control (RRC); Protocol specification (3GPP TS 38.331 version 16.3.1 Release 16)", ETSI Ts 138 331 V16.3.1, Jan. 2021, 916 pages.
International Search Report and Written Opinion issued May 26, 2022 regarding Application No. PCT/KR2022/002363, 6 pages.
CATT, "Discussion on reliability improvement mechanism for RRC_CONNECTED UEs in MBS", 3GPP TSG RAN WG1 #104-e, R1-2100355, Jan. 2020, 12 pages.
CMCC, "Discussion on reliability improvement", 3GPP TSG RAN WG1 #104-e, R1-2101064, Jan. 2021, 7 pages.
Intel Corporation, "Mechanisms to Improve Reliability of NR MBS for RRC_CONNECTED UEs", 3GPP TSG RAN WG1 #104-e, R1-2100675, Jan. 2021, 8 pages.
Vivo, "Discussion on mechanisms to improve reliability for RRC_CONNECTED UEs", 3GPP TSG RAN WG1 #104-e, R1-2100470, Jan. 2021, 9 pages.
Extended European Search Report issued Jun. 28, 2024 regarding Application No. 22759983.4, 13 pages.

* cited by examiner

MECHANISMS FOR DETERMINATION OF ACKNOWLEDGMENT INFORMATION REPORTS

CROSS-REFERENCE TO RELATED APPLICATION AND CLAIM OF PRIORITY

This application claims priority under 35 U.S.C. § 119(e) to U.S. Provisional Patent Application No. 63/152,710 filed on Feb. 23, 2021. The above-identified provisional patent application is hereby incorporated by reference in its entirety.

TECHNICAL FIELD

The present disclosure relates generally to wireless communication systems and, more specifically, the present disclosure relates to mechanisms for determining acknowledgment information reports.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to mechanisms for determination of acknowledgment information reports.

In one embodiment, a method is provided. The method includes receiving: first physical downlink control channels (PDCCHs) providing first downlink control information (DCI) formats associated with a first set of radio network temporary identifiers (RNTIs), and second PDCCHs providing second DCI formats associated with a second set of RNTIs. The method further includes determining: first hybrid automatic request acknowledgement (HARQ-ACK) information associated with the first DCI formats, second HARQ-ACK information associated with the second DCI formats, and a physical uplink control channel (PUCCH) resource indicated by a last DCI format from the first DCI formats. The first DCI formats indicate a slot for transmission of a first PUCCH with the first HARQ-ACK information. The second DCI formats indicate the slot for transmission of a second PUCCH with the second HARQ-ACK information. The last DCI format is provided in a PDCCH reception from the first PDCCH receptions that starts last among the first PDCCH receptions. The method further includes transmitting a PUCCH in the slot using the PUCCH resource. The PUCCH includes the first HARQ-ACK information and the second HARQ-ACK information.

In another embodiment, a user equipment (UE) is provided. The UE includes a transceiver configured to receive: first PDCCHs providing first DCI formats associated with a first set of RNTIs, and second PDCCHs providing second DCI formats associated with a second set of RNTIs. The UE further includes a processor operably coupled to the transceiver, the processor configured to determine: first HARQ-ACK information associated with the first DCI formats, second HARQ-ACK information associated with the second DCI formats, and a PUCCH resource indicated by a last DCI format from the first DCI formats. The first DCI formats indicate a slot for transmission of a first PUCCH with the first HARQ-ACK information. The second DCI formats indicate the slot for transmission of a second PUCCH with the second HARQ-ACK information. The last DCI format is provided in a PDCCH reception from the first PDCCH receptions that starts last among the first PDCCH receptions. The transceiver is further configured to transmit a PUCCH in the slot using the PUCCH resource. The PUCCH includes the first HARQ-ACK information and the second HARQ-ACK information.

In yet another embodiment, a base station is provided. The base station includes a transceiver configured to transmit: first PDCCHs providing first DCI formats associated with a first set of RNTIs, and second PDCCHs providing second DCI formats associated with a second set of RNTIs. The base station further includes a processor operably coupled to the transceiver, the processor configured to determine a PUCCH resource indicated by a last DCI format from the first DCI formats. The first DCI formats indicate a slot for transmission of a first PUCCH with first HARQ-ACK information. The second DCI formats indicate the slot for transmission of a second PUCCH with second HARQ-ACK information. The last DCI format is provided in a PDCCH transmission from the first PDCCH transmissions that starts last among the first PDCCH transmissions. The transceiver is further configured to receive the PUCCH in the slot using the PUCCH resource. The PUCCH includes the first HARQ-ACK information associated with the first DCI formats and the second HARQ-ACK information associated with the second DCI formats.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
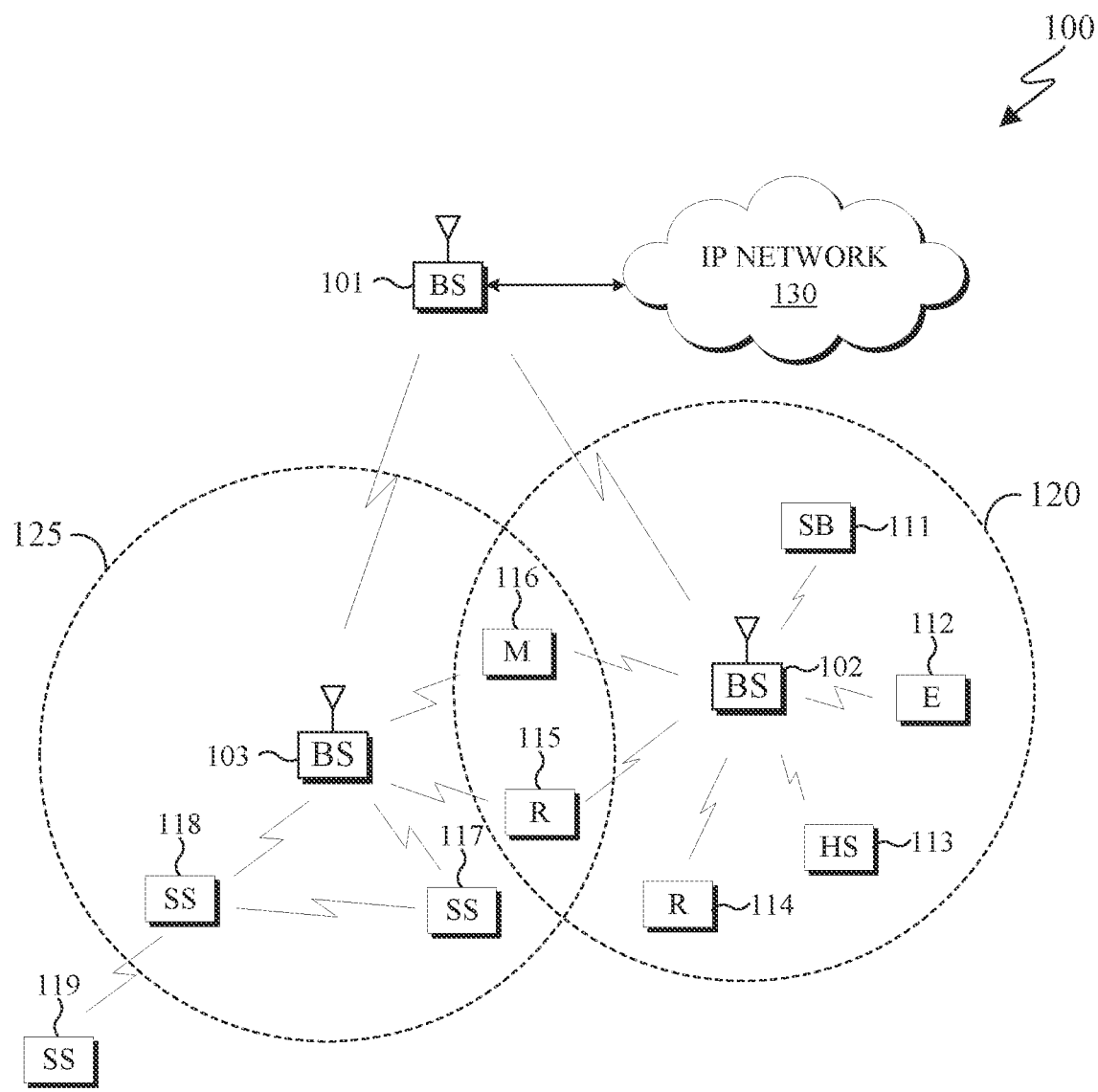
FIG. 1 illustrates an example wireless network according to embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: [1] 3GPP TS 38.211 v16.4.0, "NR; Physical channels and modulation;" [2] 3GPP TS 38.212 v16.4.0, "NR; Multiplexing and Channel coding;" [3] 3GPP TS 38.213 v16.4.0, "NR; Physical Layer Procedures for Control;" [4] 3GPP TS 38.214 v16.4.0, "NR; Physical Layer Procedures for Data;" [5] 3GPP TS 38.321 v16.3.0, "NR; Medium Access Control (MAC) protocol specification;" and [6] 3GPP TS 38.331 v16.3.1, "NR; Radio Resource Control (RRC) Protocol Specification."

To meet the demand for wireless data traffic having increased since deployment of the fourth generation (4G) communication systems and to enable various vertical applications, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The present disclosure relates generally to wireless communication systems. In certain embodiments, the present disclosure relates to generation of acknowledgement information reports by a user equipment to a base station.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

Figure 2:
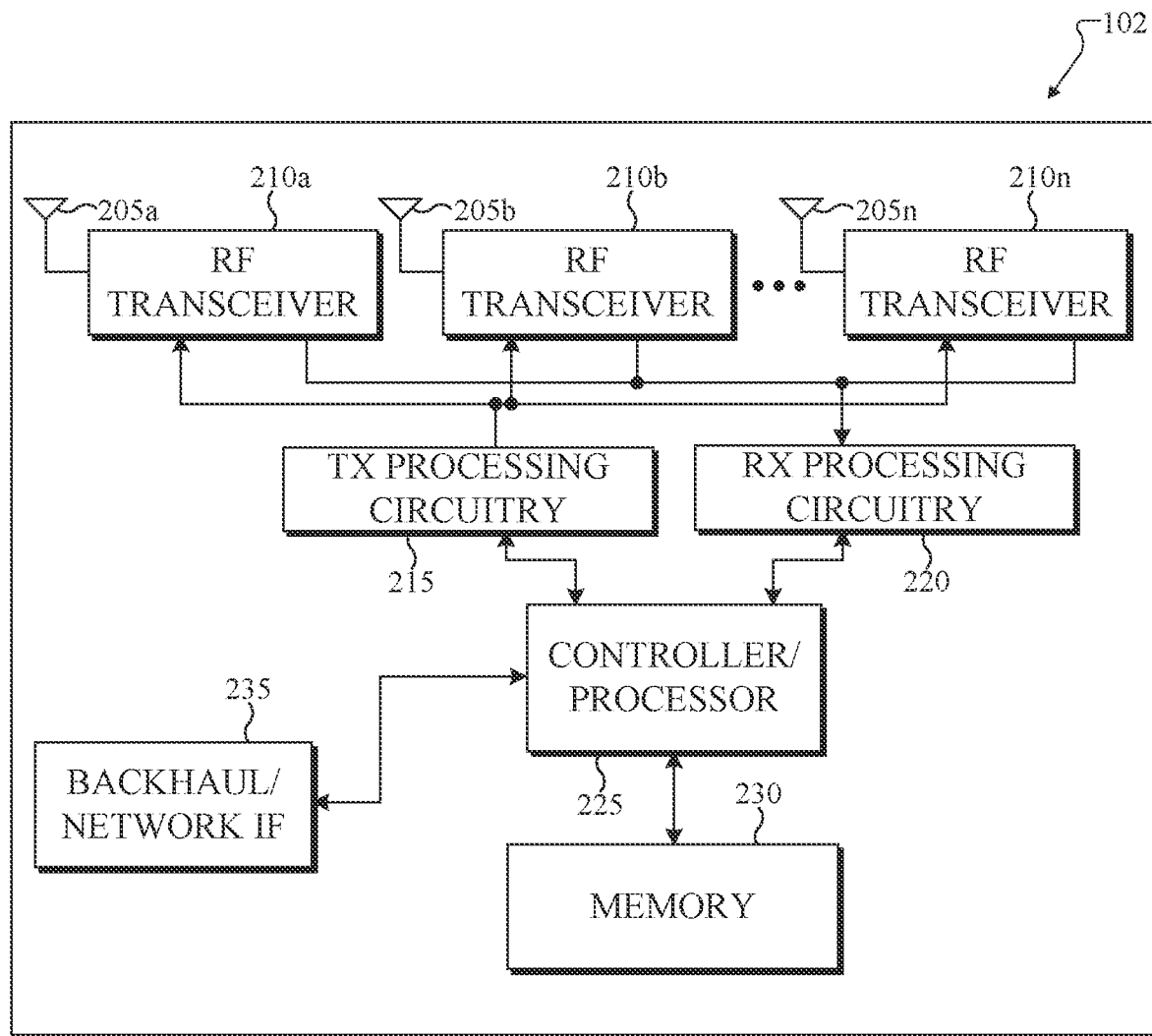
FIG. 2 illustrates an example base station (BS) according to embodiments of the present disclosure.
Figure 3:
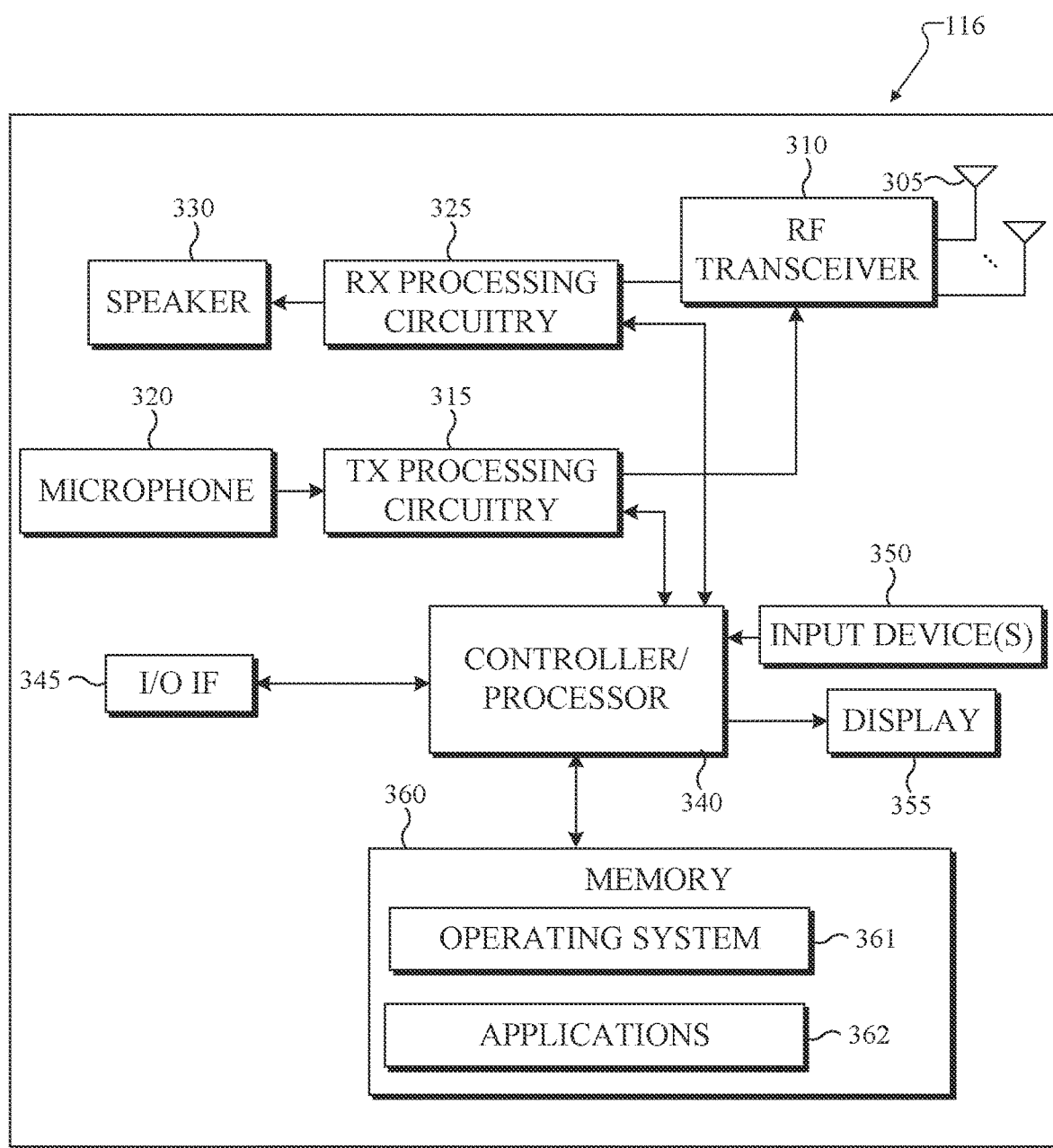
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes various gNodeB (bNG) such a base station, BS 101, a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115, the UE 116, the UE 117, and the UE 118. In some embodiments, one or more of the BSs 101-103 may communicate with each other and with the UEs 111-118 using 5G/NR, long term evolution (LTE), long term evolution-advanced (LTE-A), WiMAX, WiFi, or other wireless communication techniques.

In certain embodiments, multiple UEs (such as the UE 117, the UE 118, and the UE 119) may communicate directly with each other through device-2-device communication. In some embodiments, a UE, such as UE 119, is outside the coverage area of the network, but can communicate with other UEs inside the coverage area of the network, such as UE 118, or outside the coverage area of the network.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-119 include circuitry, programing, or a combination thereof for determining acknowledgment information reports. In certain embodiments, and one or more of the BSs 101-103 includes circuitry, programing, or a combination thereof for determining acknowledgment information reports.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate intermediate frequency (IF) or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support mechanisms for determining acknowledgment information reports. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an operating system. The controller/processor 225 can move data into or out of the memory 230 as required by an executing process. In certain embodiments, the controller/processor 225 supports communication between entities, such as web real time communications (RTC). For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the transmit and receive paths of a BS, such as the BS 102 (implemented using the RF transceivers 210a-210n, TX processing circuitry 215, and/or RX processing circuitry 220) support communication with aggregation of frequency division duplexing (FDD) cells and time division duplexing (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an IF or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
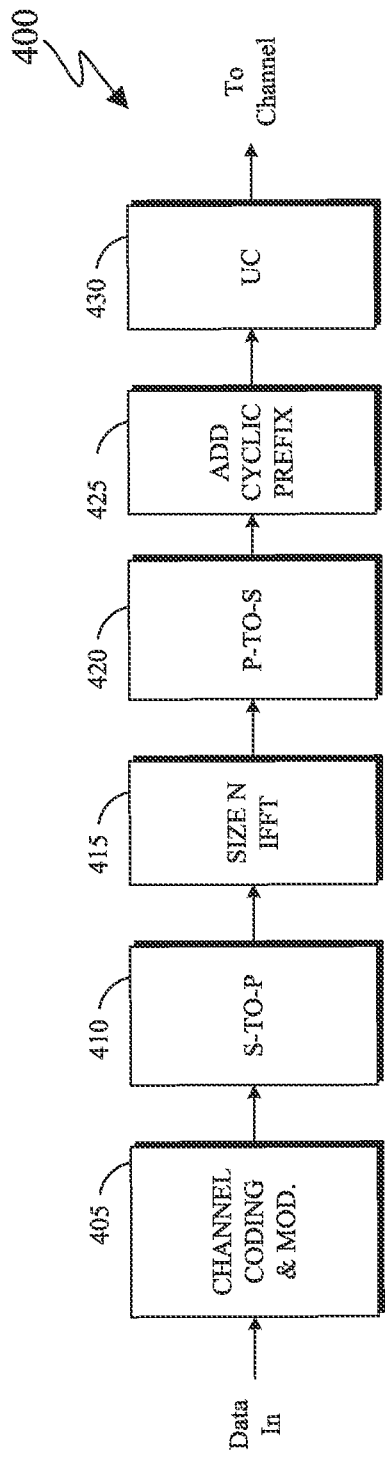
FIGS. 4 and 5 illustrate example wireless transmit and receive paths according to embodiments of present disclosure.
Figure 5:
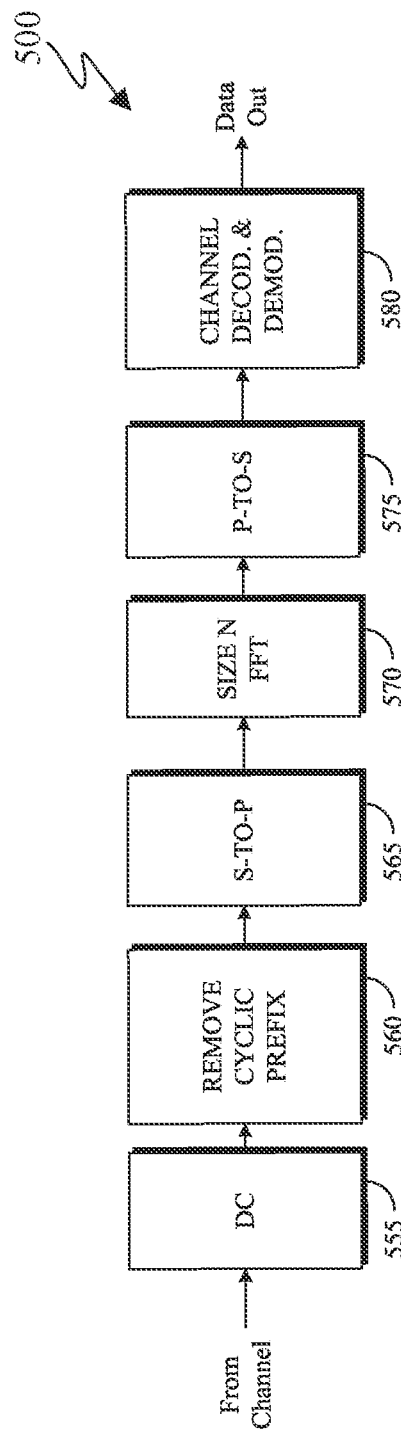

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support mechanisms for determining acknowledgment information reports as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-118. Similarly, each of UEs 111-118 may implement the transmit path 400 for transmitting in the uplink to the BSs 101-103 and may implement the receive path 500 for receiving in the downlink from the BSs 101-103.

Furthermore, each of UEs 111-119 may implement a transmit path 400 for transmitting in the sidelink to another one of UEs 111-119 and may implement a receive path 500 for receiving in the sidelink from another one of UEs 111-119.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for downlink (DL) signaling or for uplink (UL) signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration µ as $2^{\mu} \cdot 15$ kHz. A unit of one sub-carrier over one symbol is referred to as a resource element (RE). A unit of one RB over one symbol is referred to as a physical RB (PRB).

DL signals include data signals conveying information content, control signals conveying DL control information (DCI), reference signals (RS), and the like that are also known as pilot signals. A BS (such as the BS 102) transmits data information or DCI through respective PDSCHs or physical DL control channels (PDCCHs). A PDSCH or a PDCCH can be transmitted over a variable number of slot symbols including one slot symbol.

A PDCCH transmission is over a number of control channel elements (CCEs) from a predetermined set of numbers of CCEs referred to as CCE aggregation level. A PDSCH transmission is scheduled by a DCI format or is semi-persistently scheduled (SPS) as configured by higher layers and activated by a DCI format.

A PDSCH reception by a UE provides one or more transport blocks (TBs), wherein a TB is associated with a hybrid automatic repeat request (HARQ) process that is indicated by a HARQ process number field in a DCI format scheduling the PDSCH reception or activating a SPS PDSCH reception. A TB transmission can be an initial one or a retransmission as identified by a new data indicator (NDI) field in the DCI format scheduling a PDSCH reception that provides a TB retransmission for a given HARQ process number.

In certain embodiments, a gNB (such as the BS 102) transmits one or more of multiple types of reference signals (RS) including channel state information RS (CSI-RS) and demodulation RS (DMRS).

A CSI-RS is intended for UEs to perform measurements and provide channel state information (CSI) to a gNB. For channel measurement or for time tracking, non-zero power CSI-RS (NZP CSI-RS) resources are used. For interference measurement reports (IMRs), CSI interference measurement (CSI-IM) resources are used (see also REF 3). The CSI-IM resources can also be associated with a zero power CSI-RS (ZP CSI-RS) configuration. A UE can determine CSI-RS reception parameters through DL control signaling or higher layer signaling, such as radio RRC signaling from a gNB (see also REF 5). A DMRS is typically transmitted within a BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access (see also REF 1). A UE transmits data information or UCI through a respective physical UL shared channel (PUSCH) or a physical UL control channel (PUCCH). A PUSCH or a PUCCH can be transmitted over a variable number of symbols in a slot including one symbol. When a UE simultaneously transmits data information and UCI, the UE can multiplex both in a PUSCH or, depending on a UE capability, transmit both a PUSCH with data information and a PUCCH with UCI at least when the transmissions are on different cells.

UCI includes hybrid automatic repeat request acknowledgement (HARQ-ACK) information, indicating correct or incorrect decoding of transport blocks (TBs) or of code block groups (CBGs) in a PDSCH, scheduling request (SR) indicating whether a UE has data in its buffer to transmit, and CSI reports enabling a gNB to select appropriate parameters for PDSCH/TB or PDCCH/DCI format transmissions to a UE. A UE can transmit a PUCCH on a primary cell of a cell group. HARQ-ACK information is either a positive acknowledgement (ACK) when a TB decoding is correct or a negative acknowledgement (NACK) when a TB decoding is incorrect. An ACK can be represented by a binary '1' value and a NACK can be represented by a binary '0' value. A UE multiplexes HARQ-ACK information in a slot indicated by a value of PDSCH-to-HARQ_feedback timing indicator field in the DCI format, from a set of slot timing values $K_1$, or indicated by higher layers in case of a SPS PDSCH reception.

UL RS includes DMRS and SRS. DMRS is typically transmitted within a BW of a respective PUSCH or PUCCH. A gNB can use a DMRS to demodulate information in a respective PUSCH or PUCCH. SRS is transmitted by a UE to provide a gNB with an UL CSI and, for a TDD system, to also provide a PMI for DL transmission. Further, as part of a random access procedure or for other purposes, a UE can transmit a physical random access channel (PRACH).

DL receptions and UL transmissions by a UE can be configured to occur in a corresponding DL bandwidth part (BWP) and UL BWP. A DL/UL BWP is smaller than or equal to a DL/UL bandwidth of a serving cell. In certain embodiments, groupcast PDSCH receptions can occur in a common frequency region for a group of UEs, wherein the common frequency region is within an active DL BWP for each UE from the group of UEs. DL transmissions from a BS (such as the BS 102) and UL transmissions from a UE (such as the UE 116) can be based on an orthogonal frequency division multiplexing (OFDM) waveform including a variant using DFT precoding that is known as DFT-spread-OFDM.

Figure 6:
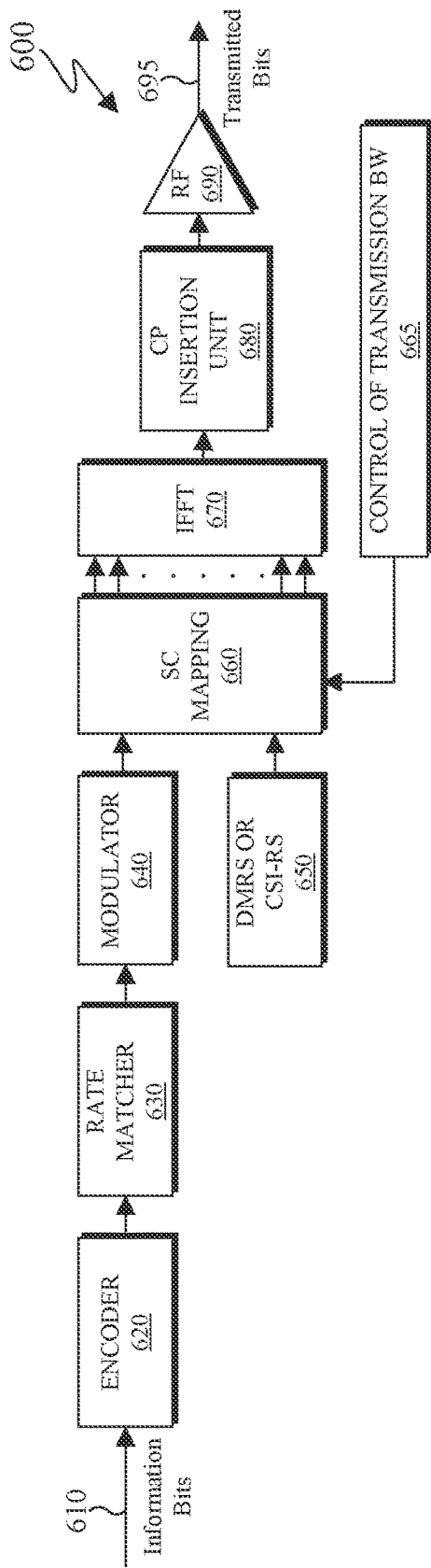
FIG. 6 illustrates a block diagram of an example transmitter structure using orthogonal frequency division multiplexing (OFDM) according to embodiments of the present disclosure.
Figure 7:
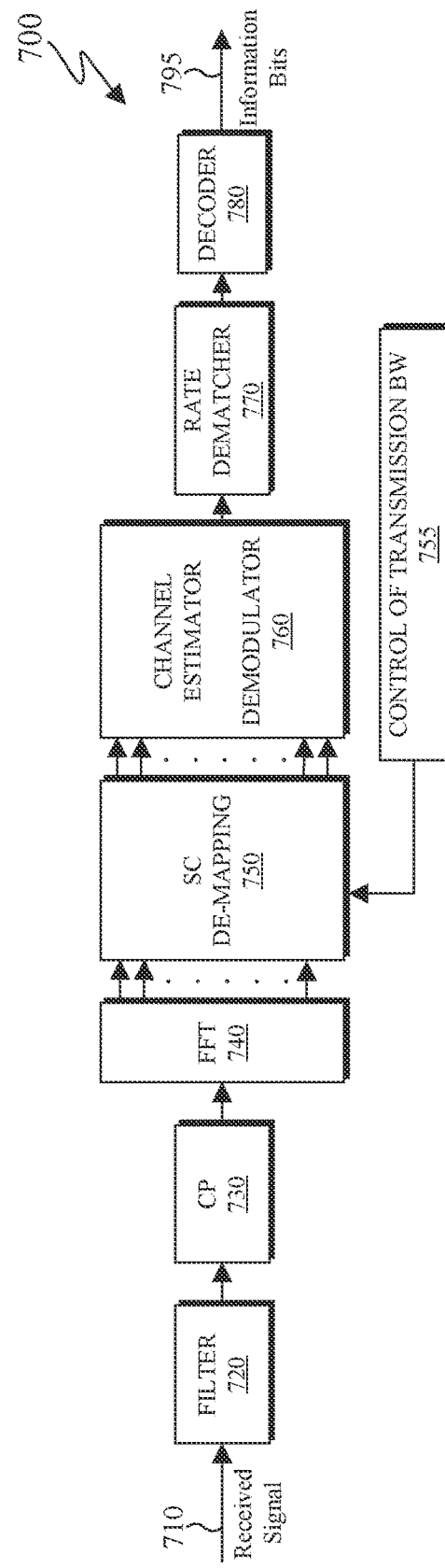
FIG. 7 illustrates a block diagram of an example receiver structure using OFDM according to embodiments of the present disclosure.

FIG. 6 illustrates a block diagram 600 of an example transmitter structure using OFDM according to embodiments of the present disclosure. FIG. 7 illustrates a block diagram 700 of an example receiver structure using OFDM according to embodiments of the present disclosure.

The transmitter structure as shown in the block diagram 600 and the receiver structure as shown in the block diagram 700 can be similar to the RF transceivers 210*a*-210*n* of FIG. 2 and the RF transceiver 310 of FIG. 3. The example block diagram 600 of FIG. 6 and the block diagram 700 of FIG. 7 are for illustration only and other embodiments can be used without departing from the scope of the present disclosure.

As illustrated in the block diagram 600, information bits 610, such as DCI bits or data bits, are encoded by encoder 620, rate matched to assigned time/frequency resources by rate matcher 630, and modulated by modulator 640. Subsequently, modulated encoded symbols and demodulation reference signal (DMRS) or CSI-RS 650 are mapped to SCs by SC mapping unit 660 with input from BW selector unit 665, an IFFT is performed by filter 670, a cyclic prefix (CP) is added by CP insertion unit 680, and a resulting signal is filtered by filter 690 and transmitted by a radio frequency (RF) unit as transmitted bits 695.

As illustrated in the block diagram 700, a received signal 710 is filtered by filter 720, a CP removal unit 730 removes a CP, a filter 740 applies a fast FFT, SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

In certain embodiments, a UE (such as the UE 116) monitors multiple candidate locations for respective potential PDCCH receptions to decode multiple DCI formats in a slot. A DCI format includes cyclic redundancy check (CRC) bits in order for the UE to confirm a correct detection of the DCI format. A DCI format type is identified by a radio network temporary identifier (RNTI) that scrambles the CRC bits.

For a DCI format scheduling a PDSCH or a PUSCH to a single UE (such as the UE 116), the RNTI can be (i) a cell RNTI (C-RNTI), (ii) a configured scheduling RNTI (CS-RNTI), or (iii) a modulation and coding scheme (MCS)-C-RNTI and serves as a UE identifier. In the following, for brevity, only the C-RNTI will be referred to when needed. A UE can receive/monitor PDCCH for detections of DCI formats with CRC scrambled by a C-RNTI according to a UE-specific search space (USS). For DCI format 0_0 and DCI format 1_0 that schedule PUSCH transmissions and PDSCH receptions, respectively, to a UE, the UE can additionally be configured to monitor corresponding PDCCH according to common search space (CSS).

For a DCI format scheduling a PDSCH conveying system information (SI), the RNTI can be an SI-RNTI. For a DCI format scheduling a PDSCH providing a random access response (RAR), the RNTI can be an RA-RNTI. For a DCI format scheduling a PDSCH providing paging information, the RNTI can be a P-RNTI. A UE monitors PDCCH for these DCI formats according to a corresponding CSS on a primary cell. There are also a number of other RNTIs provided to a UE by UE-specific RRC signaling and are associated with DCI formats providing various control information and have corresponding PDCCHs that a UE monitors according to a Type-3 CSS on the primary cell or on a secondary cell. Such DCI formats include a DCI format 2_0 providing a structure of a slot in term of DL, UL or flexible/reserved symbols over a number of slots, a DCI format 2_2 providing transmit power control (TPC) commands for PUSCH or PUCCH transmissions, a DCI format 2_3 providing TPC commands for SRS transmissions and also potentially triggering a SRS transmission on a number of cells, and so on, and a corresponding CSS is referred to as Type-3-PDCCH CSS.

Similar to DCI formats providing information to a UE for parameters associated with receptions or transmissions by the UE, a UE (such as the UE 116) can be configured to monitor PDCCH for detection of a DCI format scheduling a broadcast or a groupcast PDSCH transmission. Such a DCI format may also not include a PUCCH resource indication for each UE from the group of UEs, or may not include a counter downlink assignment index (DAI) or a total DAI for determination of a Type-2 HARQ-ACK codebook, and so on, and there may not be another DCI format for the UE to detect before the UE needs to provide an acknowledgement information report regarding a detection of the DCI format.

When a UE does not detect a DCI format providing information for parameters associated with receptions or transmissions by the UE, it is generally beneficial for the UE to inform a serving gNB so that the UE and the gNB have a same understanding. Such information can be considered as acknowledgement information for the detection or absence of detection of the DCI format.

In certain embodiments, a UE may need to report HARQ-ACK information in response to correct or incorrect detection of a DCI format together with HARQ-ACK information in response to correct or incorrect detection of TBs. For example, the HARQ-ACK information for a detection of a DCI format can be for a DCI format indicating an SPS PDSCH release or for a DCI format indicating a dormant/non-dormant BWP for a cell from a group of cells, and so on. For brevity, only HARQ-ACK information in response to correct or incorrect reception of TBs is subsequently considered but it should be understood that HARQ-ACK information can also be in response to additional reception outcomes. The HARQ-ACK information report can be based on one of several codebook types such as a Type-1 HARQ-ACK codebook or a Type-2 HARQ-ACK codebook.

In certain embodiments, a UE can determine a PUCCH transmission power $P_{PUCCH,b,f,c}$ on an active UL BWP b of carrier f in a cell c using PUCCH power control adjustment state with index l as in Equation (1).

$$P_{PUCCH,b,f,c} = \min \left\{ \begin{array}{l} P_{CMAX,f,c} \\ P_{O\_PUCCH,b,f,c} + 10\log_{10}(2^\mu \cdot M_{RB,b,f,c}^{PUCCH}) + \\ PL_{b,f,c} + \Delta_{F\_PUCCH} + \Delta_{TF,b,f,c} + g_{b,f,c} \end{array} \right\} [dBm] \quad (1)$$

Here, the corresponding parameters are described in detail in REF 3. For example, $P_{CMAX,f,c}$ is a maximum transmission power, $P_{O\_PUCCH,b,f,c}$ is a nominal received power, μ is a sub-carrier spacing (SCS) configuration with μ=0 corresponding to 15 kHz, $M_{RB,b,f,c}^{PUCCH}$ is a number of RBs for the PUCCH transmission, $PL_{b,f,c}$ is a measured path-loss, $\Delta_{F\_PUCCH}$ depends on several parameters for the PUCCH transmission including a PUCCH format, $A_{TF,b,f,c}$ provides an adjustment according to a spectral efficiency, and $g_{b,f,c}$ is a closed-loop power control state based on transmit power control (TPC) command values the UE receives in DCI formats.

A UE can also multiplex HARQ-ACK information in a PUSCH transmission. Then, a UE determines a number of coded modulation symbols for the HARQ-ACK information based on a number of HARQ-ACK information bits, a spectral efficiency of the PUSCH transmission, and a scaling factor $\beta_{offset}^{HARQ-ACK}$. Further, the UE can reserve a number of REs in the PUSCH transmission for multiplexing a number of HARQ-ACK information bits, such as two bits, in order to avoid error events where a serving gNB expects HARQ-ACK information to be multiplexed in the PUSCH transmission but the UE fails to detect a DCI format associated with the HARQ-ACK information.

When a PDSCH reception is by a single UE it can then referred to as unicast PDSCH reception. When a PDSCH reception is by a group of UEs it can then referred to as groupcast PDSCH reception. A UE can be configured to receive both unicast PDSCH and groupcast PDSCH. The UE can identify whether a PDSCH reception is a unicast one or a groupcast on based on the DCI format scheduling the PDSCH reception or based on a configuration by higher layers when the PDSCH reception is not scheduled by a DCI format. For example, a DCI format with CRC scrambled by a first RNTI, such as a cell-RNTI (C-RNTI), or having a field indicating a first PDSCH type, such as unicast PDSCH, can be used to schedule a unicast PDSCH reception while a DCI format with CRC scrambled by a second RNTI, such as a group-RNTI (G-RNTI), or having a field indicating a second PDSCH type, such as groupcast PDSCH (or multicast PDSCH or broadcast PDSCH), can be used to schedule a groupcast PDSCH reception. The terms 'groupcast' and 'multicast' are used interchangeably in the present disclosure.

When a UE receives both unicast PDSCH and groupcast PDSCH, the UE can determine how to provide corresponding HARQ-ACK information. A first option is for the UE to determine separate HARQ-ACK codebooks for unicast PDSCH receptions and for groupcast PDSCH receptions. The UE can then multiplex each of the HARQ-ACK codebooks in a separate corresponding PUCCH transmission or the UE can jointly or separately encode and multiplex the HARQ-ACK codebooks in a same PUCCH transmission. A second option is for the UE to determine a single HARQ-ACK codebook for unicast PDSCH receptions and for groupcast PDSCH receptions. The second option is not generally possible for a Type-2 HARQ-ACK codebook as, unlike a value of a first DAI field in a DCI format scheduling a unicast PDSCH reception, a value of a second DAI field in a DCI format scheduling a groupcast PDSCH reception cannot be specific to a UE and therefore the UE cannot determine a Type-2 HARQ-ACK codebook by jointly processing the values of the first and second DAI fields. For a Type-1 HARQ-ACK codebook, determining a single HARQ-ACK codebook for unicast PDSCH receptions and for groupcast PDSCH receptions is possible. A Type-1 HARQ-ACK codebook is more robust to missed detections of DCI format than a Type-2 HARQ-ACK codebook but it also results to a larger codebook size. If a Type-1 HARQ-ACK codebook for unicast PDSCH receptions and a Type-1 HARQ-ACK codebook for groupcast PDSCH receptions are to be multiplexed in a same PUCCH or PUSCH, the corresponding overhead can be large and that can also reduce coverage for a given target reception reliability.

A UE can support a predetermined number of HARQ processes, such as sixteen (16) HARQ processes. The number of supported HARQ processes can be a requirement or a capability that the UE reports to a serving gNB. When a UE is configured to receive both unicast PDSCH and groupcast PDSCH, a HARQ process for a corresponding TB can be associated either with a unicast PDSCH or with a groupcast PDSCH for a corresponding Type-2 HARQ-ACK codebook. When an initial reception of a TB is provided by a groupcast PDSCH reception by a UE, a subsequent reception of the TB can be provided either by a groupcast PDSCH reception or by a unicast PDSCH reception by the UE, for example when the UE reports a NACK value for the initial reception of the TB, and the UE can multiplex HARQ-ACK information for the subsequent reception of the TB in a HARQ-ACK codebook for groupcast PDSCH receptions or in a HARQ-ACK codebook for unicast PDSCH receptions, respectively.

HARQ-ACK information in response to TB receptions from unicast PDSCH receptions can be associated with multiple priorities. Similar, HARQ-ACK information in response to TB receptions from groupcast PDSCH receptions can also be associated with multiple priorities. When a UE would transmit a first PUCCH with HARQ-ACK information report associated with a detection of a DCI format with CRC scrambled by a C-RNTI (unicast HARQ-ACK information) and a second PUCCH with HARQ-ACK information report associated with a detection of a DCI format with CRC scrambled by a G-RNTI (groupcast HARQ-ACK information), the UE may determine whether to multiplex the two HARQ-ACK information reports in a same PUCCH. If the UE determines to multiplex the two HARQ-ACK information reports in a same PUCCH, the UE may also determine a corresponding PUCCH resource. Otherwise, the UE may determine whether to transmit the first PUCCH or the second PUCCH (and to drop transmission of the second PUCCH or the first PUCCH, respectively).

In certain embodiments, a serving gNB (such as the BS 102) can provide by higher layer signaling to a UE (such as the UE 116) a number of PUCCH resource sets for the UE to determine a PUCCH resource set and a PUCCH resource from the PUCCH resource set for transmission of HARQ-ACK information in response to a correct or incorrect detection of a TB in a groupcast PDSCH reception. The UE determines a PUCCH resource set based on a payload of a corresponding HARQ-ACK information as described in REF 3. To enable flexible allocation of PUCCH resources, a PUCCH resource indicator field, with fixed or configurable size, can be included in a DCI format scheduling a groupcast PDSCH reception and a UE can then determine a PUCCH resource based on a value of the field. The UE can also be provided a PUCCH resource set for multiplexing HARQ-ACK information in response to unicast PDSCH receptions in a PUCCH transmission. The UE determines a PUCCH resource based on a value of a PUCCH resource indicator field in a last DCI format that the UE correctly receives and generates corresponding HARQ-ACK information that is included in a PUCCH transmission using the PUCCH resource. The last DCI format is provided by a PDCCH reception that starts after all other PDCCH receptions providing DCI formats with corresponding HARQ-ACK information multiplexed in a same PUCCH. In case of multiple PDCCH receptions that start last at a same symbol and provide DCI formats scheduling PDSCH receptions on respective multiple cells, the last PDCCH reception is the one corresponding to a cell from the multiple cells with a largest cell index. When the UE multiplexes unicast and groupcast HARQ-ACK information in a same HARQ-ACK codebook, it is not generally possible for the UE to determine a PUCCH resource based on a value of a PUCCH resource indicator field in a DCI format scheduling a groupcast PDSCH reception as a value of the PUCCH resource indicator field needs to indicate a PUCCH resource to multiple UEs and cannot account for the unicast HARQ-ACK information.

In certain embodiments, when a UE (such as the UE 116) multiplexes HARQ-ACK information in a PUSCH transmission, a DCI format scheduling the PUSCH transmission includes a DAI field providing information to the UE for multiplexing the HARQ-ACK information in the PUSCH. When the UE provides a Type-1 HARQ-ACK codebook, the DAI field comprises of 1 bit with a value indicating whether or not the UE should multiplex a Type-1 HARQ-ACK codebook in the PUSCH. When the UE provides a Type-2 HARQ-ACK codebook, the DAI field indicates a total number of DCI formats (modulo the maximum value of the DAI field) that the UE needs to provide corresponding information in the Type-2 HARQ-ACK codebook to be multiplexed in the PUSCH. When the UE multiplexes HARQ-ACK information for both unicast and groupcast PDSCH receptions, the UL DAI field needs to account for both the unicast and groupcast HARQ-ACK information.

A UE (such as the UE 116) can determine a number of resource elements (REs) in a PUSCH for multiplexing HARQ-ACK information. The determination can be based on a number of HARQ-ACK information bits, a value $\beta_{PUSCH}^{HARQ-ACK}$ of a beta_offset field scaling a number of REs that are determined based on the MCS of a TB in the PUSCH and a value of a scaling parameter α that indicates a fraction (upper limit) of PUSCH REs that are not used for RS transmission and can be available for multiplexing HARQ-ACK information (or, in general, UCI) in the PUSCH, as described in REF 2. When a DCI format scheduling a PUSCH transmission does not include a beta_offset field indicating a $\beta_{PUSCH}^{HARQ-ACK}$ value, the $\beta_{PUSCH}^{HARQ-ACK}$ value is provided by a higher layer parameter betaOffsets; otherwise, betaOffsets provides multiple values, such as 2 or 4 values, and the beta_offset field in the DCI format indicates one $\beta_{PUSCH}^{HARQ-ACK}$ value. A value of α is provided by higher layer parameter scaling. HARQ-ACK information for TB receptions in unicast PDSCH can require different reliability than HARQ-ACK information for TB receptions in groupcast PDSCH, thereby requiring a separate indication of a $\beta_{PUSCH}^{HARQ-ACK}$ or of a α value. Therefore, a UE can be provided a first higher layer information element UCI-OnPUSCH, that includes the betaOffsets and scaling fields, for unicast HARQ-ACK information and a second UCI-OnPUSCH for groupcast HARQ-ACK information. A procedure needs to be defined for a UE to determine applicable values for the beta Offsets and scaling fields when the UE multiplexes both unicast HARQ-ACK information and groupcast HARQ-ACK information in a PUSCH. Further, a number of reserved REs in a PUSCH for multiplexing HARQ-ACK information needs to be defined when the UE multiplexes both unicast and groupcast HARQ-ACK information in the PUSCH.

A gNB (such as the BS 102) can disable a HARQ-ACK information report from a UE based on an indication in a DCI format scheduling a corresponding PDSCH reception. For example, a first UE can be configured by higher layers to not provide HARQ-ACK information for a corresponding PDSCH reception and a second UE may not be provided such configuration (default operation then is for the second UE to provide, or to not provide, HARQ-ACK information for a corresponding PDSCH reception) or the second UE may be configured by higher layers to provide HARQ-ACK information for a corresponding PDSCH reception. A DCI format scheduling a PDSCH reception can include a binary field indicating whether or not a corresponding HARQ-ACK information report is enabled or disabled and the second UE can determine whether or not to provide HARQ-ACK information for the PDSCH reception based on the indication. The indication to enable or disable a HARQ-ACK information report by a DCI format scheduling a corresponding PDSCH reception can depend on a HARQ-ACK codebook type that is configured to the UE as such indication by the DCI format is not always applicable.

A UE (such as the UE 116) can be configured to receive PDSCHs using frequency duplex multiplexing (FDM) in a BWP, or in a common frequency region within an active DL BWP for groupcast PDSCH, of a serving cell. Such configuration can be based on an indication by the UE of a corresponding capability. The PDSCH receptions can correspond to different services such as a first unicast and a first groupcast service or a first groupcast service and a second groupcast service. For a single transmission/reception point (TRP), Type-1 and Type-2 HARQ-ACK codebooks are currently restricted to supporting a single PDSCH reception per serving cell at a given time and do not support FDM PDSCH receptions on a serving cell.

Therefore, embodiments of the present disclosure take into consideration that there is a need for a UE to determine a PUCCH resource for a PUCCH transmission with unicast and groupcast HARQ-ACK information.

Embodiments of the present disclosure also take into consideration that there is a need to determine conditions for applicability of an indication by a DCI format to either enable or disable a HARQ-ACK information report from a UE for a corresponding PDSCH reception by the UE based on a HARQ-ACK codebook type configured to the UE and to determine modifications to a construction of an applicable HARQ-ACK codebook type.

Embodiments of the present disclosure further take into consideration that there is a need to design a Type-1 HARQ-ACK codebook and a Type-2 HARQ-ACK codebook to support FDM PDSCH receptions from a single TRP on a serving cell.

Accordingly, embodiments of the present disclosure relate to determining a PUCCH resource for a PUCCH transmission with unicast and groupcast HARQ-ACK information. Embodiments of the present disclosure also relate to determining conditions for applicability of an indication by a DCI format to either enable or disable a HARQ-ACK information report from a UE for a corresponding PDSCH reception by the UE based on a HARQ-ACK codebook type configured to the UE and to determine modifications to a construction of an applicable HARQ-ACK codebook type. Embodiments of the present disclosure further relate to designing a Type-1 HARQ-ACK codebook and a Type-2 HARQ-ACK codebook to support FDM PDSCH receptions from a single TRP on a serving cell.

It is noted that reference to HARQ-ACK information associated with DCI formats scheduling PDSCH receptions is typically with respect to PDSCH receptions but can also be for reception of a SPS PDSCH release, or for a DCI format with CRC scrambled by a RNTI associated with scheduling a PDSCH reception that instead indicates dormant/non-dormant active DL BWPs for the UE in a group of cells without scheduling a PDSCH reception or, in general, for any DCI format associated with a HARQ-ACK information report and does not schedule a reception of a PDSCH that provides TBs.

The term "higher layers" is used to denote control information that a UE is provided in a PDSCH reception, such as radio resource control (RRC) or a medium access control (MAC) control element (CE).

Embodiments of the present disclosure describe PUCCH resource determination for a PUCCH transmission with unicast and groupcast HARQ-ACK information. This is described in the following examples and embodiments, such as those of FIGS. 8 and 9.

Figure 8:
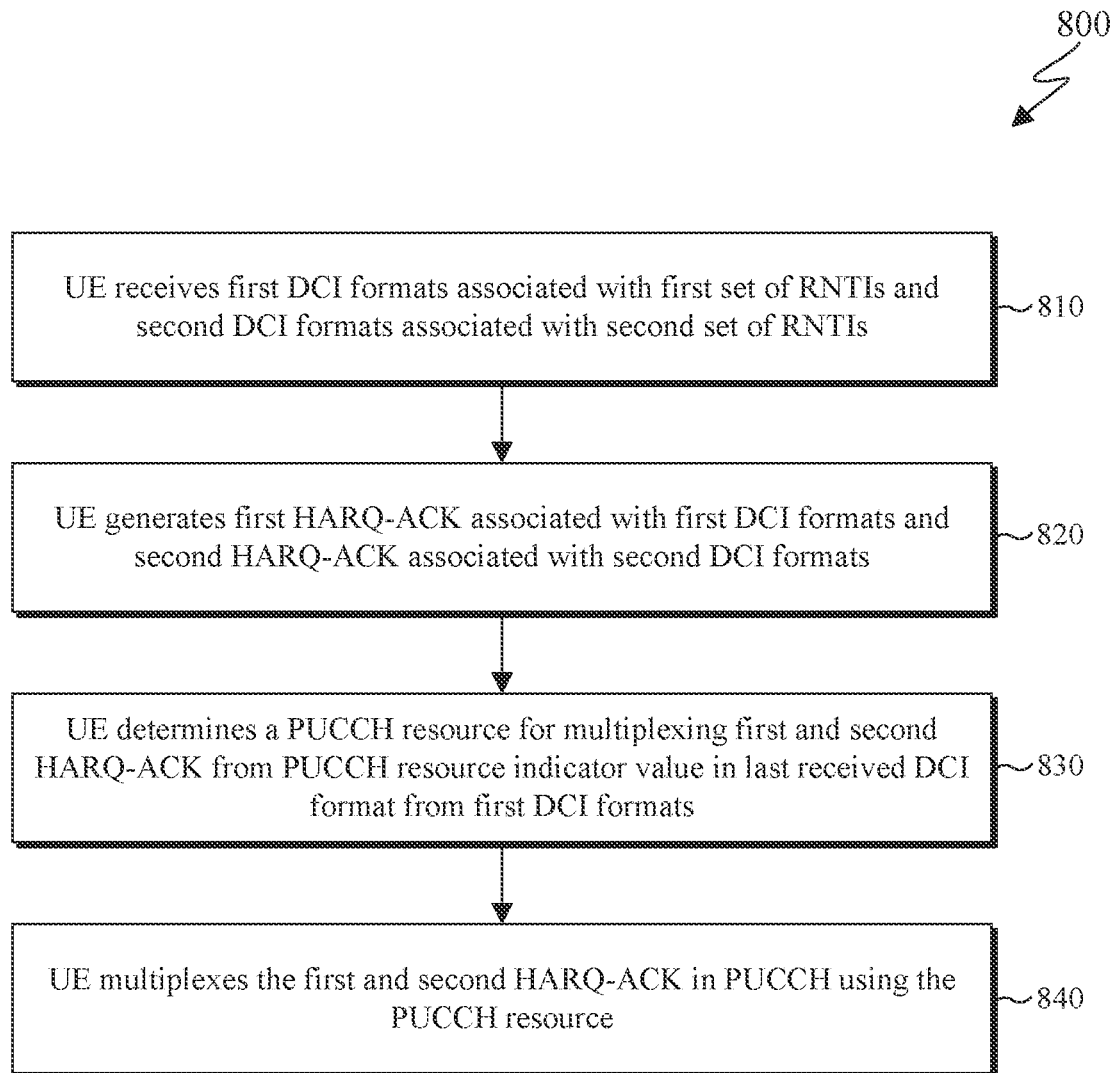
FIG. 8 illustrates a method for a UE to multiplex first HARQ-ACK information and second HARQ-ACK information in a PUCCH according to embodiments of present disclosure.
Figure 9:
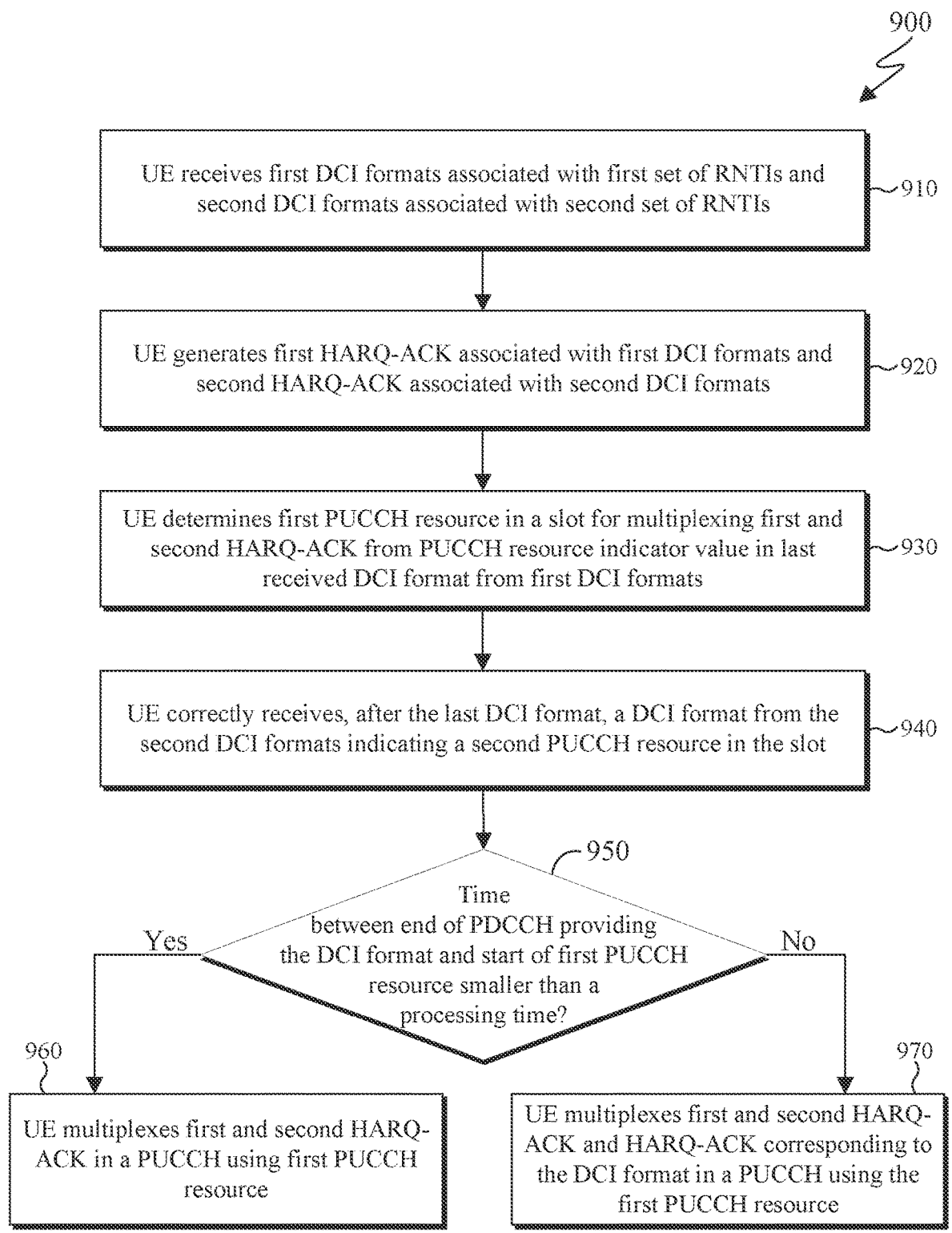
FIG. 9 illustrates a method for a UE to determine whether to multiplex HARQ-ACK information in a PUCCH according to embodiments of present disclosure.

FIG. 8 illustrates a method 800 for a UE to multiplex first HARQ-ACK information and second HARQ-ACK information in a PUCCH according to embodiments of present disclosure. FIG. 9 illustrates a method 900 for a UE to determine whether to multiplex HARQ-ACK information in a PUCCH according to embodiments of present disclosure. The steps of the method 800 of FIG. 8 and the method 900 of FIG. 9 can be performed by any of the UEs 111-119 of FIG. 1, such as the UE 116 of FIG. 3. The methods 800 and 900 are for illustration only and other embodiments can be used without departing from the scope of the present disclosure.

Embodiments of the disclosure consider a procedure for determining a PUCCH resource for a PUCCH transmission with first HARQ-ACK information corresponding to first DCI formats with CRC scrambled by an RNTI from a first set of RNTIs and second HARQ-ACK information corresponding to second DCI formats with CRC scrambled by an RNTI from a second set of RNTIs.

A UE (such as the UE 116) can be configured by higher layers a first set of RNTIs, such as a C-RNTI, MCS-C-RNTI, or CS-RNTI, for scrambling a CRC of a DCI format scheduling PDSCH receptions such as unicast PDSCH receptions and a second set of RNTIs, such as a number of G-RNTIs or G-CS-RNTIs, for scrambling a CRC of a DCI format scheduling PDSCH receptions such as groupcast/multicast PDSCH receptions. DCI formats with CRC scrambled by an RNTI from the first set of RNTIs and are associated with HARQ-ACK information from the UE will be referred to as first DCI formats. DCI formats with CRC scrambled by an RNTI from the second set of RNTIs and are associated with HARQ-ACK information from the UE will be referred to as second DCI formats. It is also possible that an association of a DCI format with first DCI formats or with second DCI formats is determined based on a value of field in the DCI format providing a corresponding indication or based on a size of the DCI format. For brevity, the following descriptions assume an RNTI-based association.

In certain embodiments, HARQ-ACK information associated with a DCI format from the first DCI formats is associated with a first HARQ-ACK codebook, such as a unicast HARQ-ACK codebook. HARQ-ACK information associated with a DCI format from the second DCI formats is associated with a second HARQ-ACK codebook, such as a groupcast/multicast HARQ-ACK codebook.

Additionally, a UE (such as the UE 116) can be provided a single PUCCH configuration, including PUCCH resource sets, by an information element PUCCH-Config for the first and second HARQ-ACK codebooks or can be provided separate (first and second) PUCCH configurations by respective information elements PUCCH-Config for each of the first and second HARQ-ACK codebooks. When the UE is provided separate PUCCH configurations and the UE multiplexes, either by joint coding or by separate coding, the first and second HARQ-ACK codebooks in a PUCCH resource, the PUCCH resource is from a PUCCH resource set of the first PUCCH configuration associated with the first HARQ-ACK codebook. This is because a value of a PUCCH resource indicator field in a DCI format associated with the second HARQ-ACK codebook cannot generally account for the HARQ-ACK payload associated with the first HARQ-ACK codebook while a value of a PUCCH resource indicator field in a DCI format associated with the first HARQ-ACK codebook can account for a total payload of both the first and second HARQ-ACK codebooks.

When the UE multiplexes both the first and second HARQ-ACK codebooks in a PUCCH, the UE determines a PUCCH resource based on a last DCI format from the first DCI formats that the UE correctly decodes. A reason is that it is not generally possible for the UE to determine a PUCCH resource based on a value of a PUCCH resource indicator field in a DCI format from the second DCI format as such value generally needs to indicate a PUCCH resource to multiple UEs and cannot account for the payload of the first HARQ-ACK codebook. If the UE is provided separate, first and second, PUCCH configurations for the first and second HARQ-ACK information and the last DCI format does not include a PUCCH resource indicator field, the UE determines a PUCCH resource to be the first one provided by the first PUCCH configuration.

As a DCI format from the second DCI formats typically needs to schedule a PDSCH reception by multiple UEs, a UE can correctly receive the DCI format after a last DCI format from the first DCI formats and, particularly for unpaired spectrum (TDD) operation, the DCI format can indicate a same slot for the UE to provide corresponding second HARQ-ACK information in the second HARQ-ACK codebook as the last DCI format for the UE to provide corresponding first HARQ-ACK information in the first HARQ-ACK codebook. Further, a first PUCCH resource indicated by the last DCI format may overlap in time in the slot with a second PUCCH resource indicated by the DCI format.

In a first approach, the UE can multiplex the first and second HARQ-ACK codebooks in a PUCCH without including the second HARQ-ACK information in the second HARQ-ACK codebook. In a second approach, the UE can multiplex the second HARQ-ACK information in the second HARQ-ACK codebook if a time between the end (last symbol) of a PDCCH providing the DCI format and the start (first symbol) of the PUCCH resource where the UE multiplexes the first and second HARQ-ACK codebooks is not smaller than a processing time the UE requires to multiplex the first and second HARQ-ACK codebooks in a PUCCH resource from a PUCCH resource set provided by the first PUCCH configuration (or by a common PUCCH configuration). For the determination of the PUCCH resource, the second approach can also apply if the UE does not consider the second HARQ-ACK information in determining a total HARQ-ACK payload, although the second HARQ-ACK information is included in the total HARQ-ACK information the UE multiplexes in a PUCCH using the PUCCH resource.

The method 800 of FIG. 8 describes an example procedure for a UE to multiplex first HARQ-ACK information and second HARQ-ACK information in a PUCCH according to this disclosure.

In step 810, a UE (such as the UE 116) receives first DCI formats associated with a first set of RNTIs and second DCI formats associated with a second set of RNTIs. In step 820, the UE generates first HARQ-ACK information associated with the first DCI formats and second HARQ-ACK information associated with the second DCI formats. In step 830, the UE determines a PUCCH resource for multiplexing the first and second HARQ-ACK information in a PUCCH based on a PUCCH resource indicator value provided by a last received DCI format from the first DCI formats. In step 840, the UE multiplexes the first and second HARQ-ACK information in the PUCCH using the PUCCH resource.

The method 900 of FIG. 9 describes an example procedure for a UE to determine whether to multiplex a HARQ-ACK information in a PUCCH according to this disclosure.

In step 910, a UE (such as the UE 116) receives first DCI formats associated with a first set of RNTIs and second DCI formats associated with a second set of RNTIs. In step 920, the UE generates first HARQ-ACK information associated with the first DCI formats and second HARQ-ACK information associated with the second DCI formats. In step 930, the UE determines a first PUCCH resource in a slot for multiplexing the first and second HARQ-ACK information in a PUCCH based on a PUCCH resource indicator value provided by a last received DCI format from the first DCI formats. In step 940, the UE correctly receives, after the last DCI format, a DCI format from the second DCI formats indicating a second PUCCH resource in the slot. The first and second PUCCH resources may overlap in time.

In step 950, the UE determines whether a time between the end of a PDCCH providing the DCI format and the start of the first PUCCH resource is smaller than a processing time. When the time between the end of a PDCCH providing the DCI format and the start of the first PUCCH resource is smaller than the processing time (as determined in step 950), the UE in step 960 multiplexes the first and second HARQ-ACK information in a PUCCH using the first PUCCH resource 760. Alternatively, when the time between the end of a PDCCH providing the DCI format and the start of the first PUCCH resource is not smaller than the processing time (as determined in step 950), the UE in step 970 multiplexes the first and second HARQ-ACK information and the HARQ-ACK information corresponding to the DCI format in a PUCCH using the first PUCCH resource.

Although FIG. 8 illustrates the method 800 and the FIG. 9 illustrates the method 900 various changes may be made to FIGS. 8 and 9. For example, while the method 800 and the method 900 are shown as a series of steps, various steps could overlap, occur in parallel, occur in a different order, or occur multiple times. In another example, steps may be omitted or replaced by other steps. For example, steps of the method 800 and the method 900 can be executed in a different order.

Embodiments of the present disclosure describe enabling or disabling a HARQ-ACK information report according to a HARQ-ACK codebook type. This is described in the following examples and embodiments, such as those of FIGS. 10 and 11. That is, embodiments of the disclosure considers a procedure to enable or disable a HARQ-ACK information report from a UE according to the HARQ-ACK codebook type.

Figure 10:
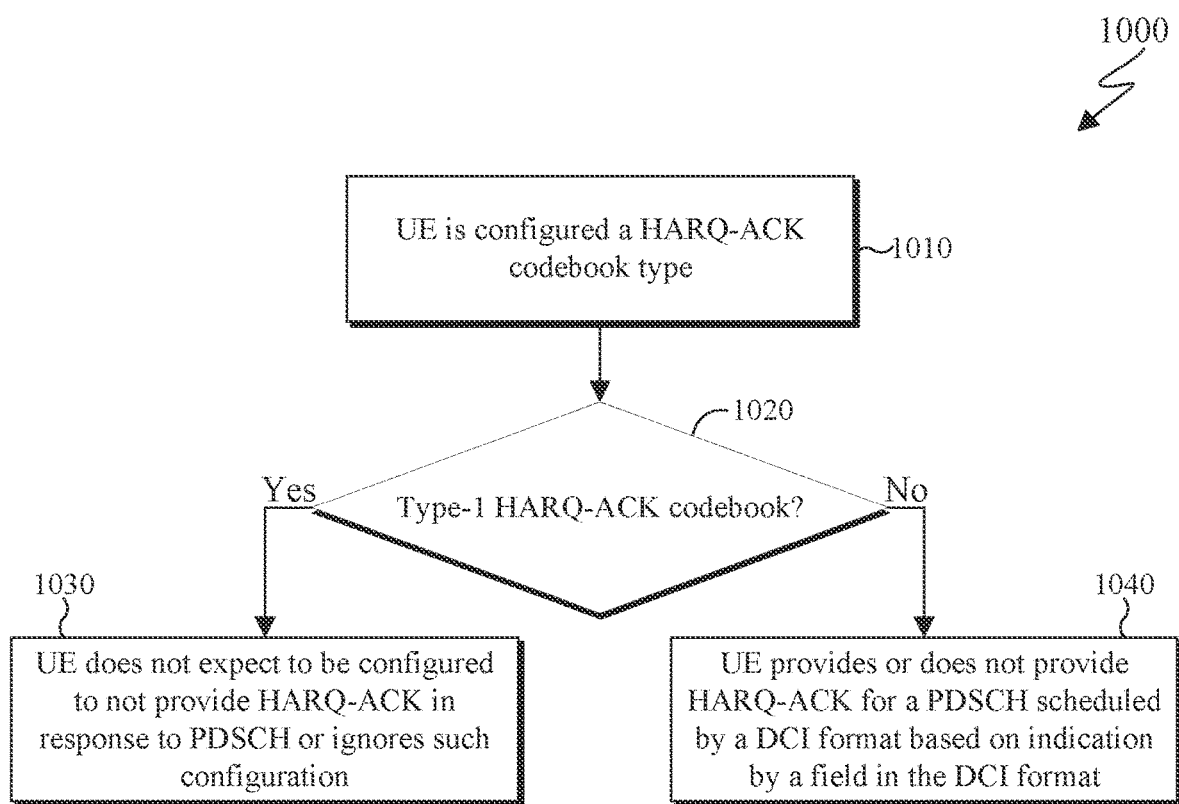
FIG. 10 illustrates a method for enabling or disabling a HARQ-ACK information report for a physical downlink shared channel (PDSCH) reception based on a HARQ-ACK codebook type according to embodiments of present disclosure.

FIG. 10 illustrates a method 1000 for enabling or disabling a HARQ-ACK information report for a PDSCH reception based on a HARQ-ACK codebook type according to embodiments of present disclosure. FIG. 10 illustrates a method 1100 for processing a DAI field format for constructing a Type-22 HARQ-ACK codebook based on an indication by the downlink control information (DCI) format for whether to provide HARQ-ACK information for one or more PDSCH receptions scheduled by the DCI format according to embodiments of present disclosure. The steps of the method 1000 of FIG. 10 and the method 1100 of FIG. 11 can be performed by any of the UEs 111-119 of FIG. 1, such as the UE 116 of FIG. 3. The methods 1000 and 1100 are for illustration only and other embodiments can be used without departing from the scope of the present disclosure.

In certain embodiments, a gNB (such as the BS 102) can configure, by a higher layer parameter such as HARQ-ACK-enable, a UE (such as the UE 116) to provide (or to not provide) HARQ-ACK information in response to PDSCH receptions. For example, when the higher layer parameter is not provided, the UE provides HARQ-ACK information. For another example, when the higher layer parameter is not provided, the UE does not provide HARQ-ACK information. A UE configured to provide (or not provide) HARQ-ACK information determines whether or not to provide an HARQ-ACK information for a PDSCH reception based on a value of a field in the DCI format scheduling the PDSCH reception. For SPS PDSCH receptions, the determination can be based on the value of the field in the DCI format activating the SPS PDSCH receptions. A UE that is not configured by higher layers to provide HARQ-ACK information for PDSCH receptions does not process the indication by the DCI format (when such indication is present in the DCI format).

A configuration to a UE for whether the UE provides HARQ-ACK information in response to PDSCH receptions can depend on a configuration for a respective HARQ-ACK codebook type. For example, when the UE is configured to provide HARQ-ACK information according to a Type-1 HARQ-ACK codebook, the UE does not expect to be configured whether to provide HARQ-ACK information in response to respective PDSCH receptions or the UE can ignore such configuration and always provide the HARQ-ACK information (that is, the configuration is inapplicable). This is because the contents of a Type-1 HARQ-ACK codebook should not rely on the UE correctly receiving DCI formats. For another example, when the UE is configured to provide HARQ-ACK information according to a Type-2 HARQ-ACK codebook, the UE can determine whether to provide HARQ-ACK information for a PDSCH reception based on a value of a field in the DCI format scheduling the PDSCH reception. The field can be a separate field comprising of one bit and indicating whether or not HARQ-ACK information is to be provided for one or more PDSCH receptions that are scheduled by the DCI format.

The method 1000 of FIG. 10 describes an example procedure for enabling or disabling a HARQ-ACK information report for a PDSCH reception based on a HARQ-ACK codebook type according to this disclosure.

In step 1010, a UE (such as the UE 116) is provided a configuration for a HARQ-ACK codebook type. In step 1020, the UE determines whether the configuration is for HARQ-ACK codebook Type-1. When the configuration is for HARQ-ACK codebook Type-1 (as determined in step 1020), the UE in step 1030 does not expect to be configured to not provide HARQ-ACK information in response to PDSCH receptions or, when provided, the UE ignores such configuration. Alternatively, when the configuration is not for HARQ-ACK codebook Type-1, such as when the configuration is for HARQ-ACK codebook Type-2 (as determined in step 1020), the UE in step 1040 provides or does not provide HARQ-ACK information for a PDSCH reception scheduled by a DCI format based on a corresponding indication by a value of a field in the DCI format.

In certain embodiments, when a UE is configured to provide HARQ-ACK information according to a Type-2 HARQ-ACK codebook, including an enhanced Type-2 HARQ-ACK codebook based on HARQ-ACK information grouping as defined in REF 3, a DAI field in a DCI formats counts only DCI formats that indicate to a UE to provide HARQ-ACK information in response to one or more PDSCH receptions that are scheduled by the DCI format. When a DCI format includes a field indicating to the UE to not provide HARQ-ACK information in response to one or more PDSCH receptions that are scheduled by the DCI format, the UE ignores the value of the DAI field from a construction of the Type-2 HARQ-ACK codebook, that is, the UE constructs the Type-2 HARQ-ACK codebook based only on DCI formats that indicate for associated HARQ-ACK information to be provided. A gNB transmitting a PDCCH with a DCI format indicating to a UE to not provide HARQ-ACK information in response to one or more PDSCH receptions that are scheduled by the DCI format may not increment the value of the DAI field in the DCI format relative to a value of the DAI field in a last DCI format indicating to a UE to provide HARQ-ACK information in response to one or more PDSCH receptions that are scheduled by the last DCI format. It is also possible that the DAI field in a DCI format indicating to the UE to not provide HARQ-ACK information in response to one or more PDSCH receptions that are scheduled by the DCI format serves other purposes such as to complement a PUCCH resource indicator field or serve as a transmission power control (TPC) command field, and so on.

Figure 11:
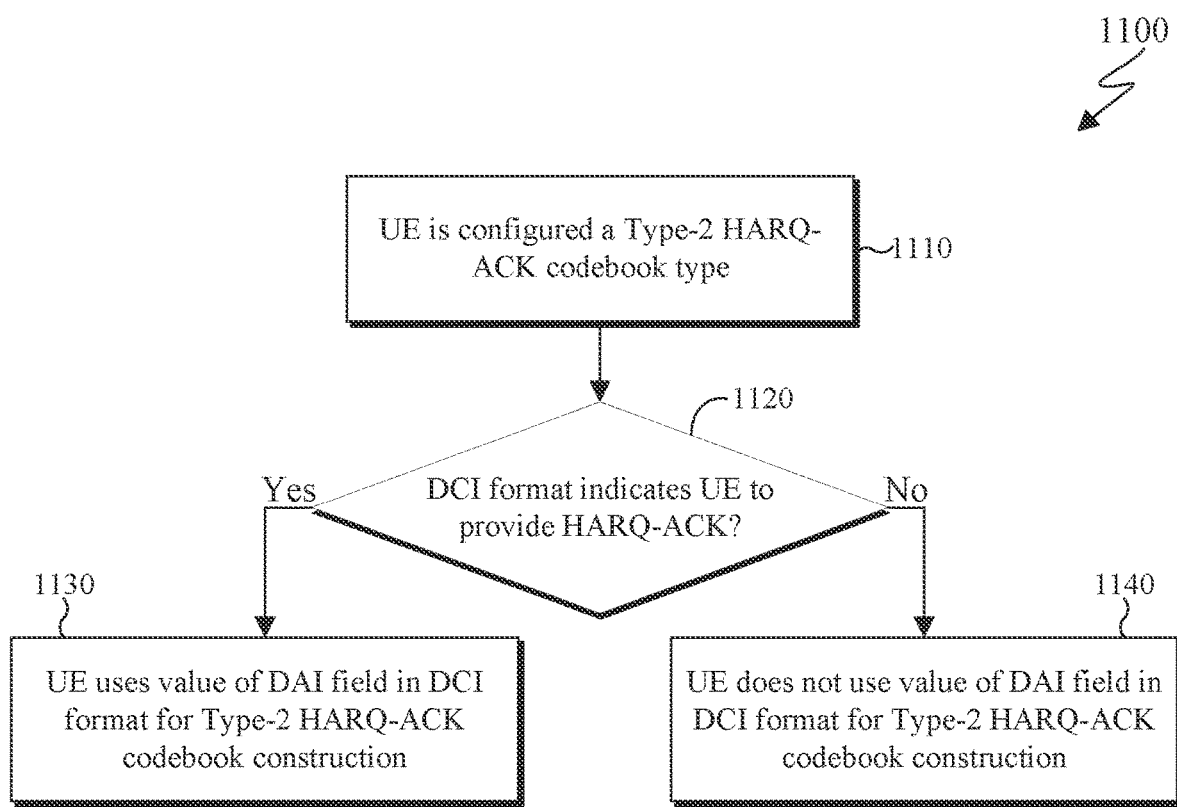
FIG. 11 illustrates a method for processing a downlink assignment index (DAI) field format for constructing a Type-22 HARQ-ACK codebook based on an indication by the DCI format for whether to provide HARQ-ACK information for one or more PDSCH receptions scheduled by the DCI format according to embodiments of present disclosure.

The method 1100 of FIG. 11 describes an example procedure for processing a DAI field in a DCI format for constructing a Type-22 HARQ-ACK codebook based on an indication by the DCI format for whether or not to provide HARQ-ACK information for one or more PDSCH receptions scheduled by the DCI format according to this disclosure.

In step 1110, a UE (such as the UE 116) is configured to provide HARQ-ACK information according to a Type-2 HARQ-ACK codebook. In step 1120, the UE determines whether a DCI format scheduling one or more PDSCH receptions indicates that the UE provides corresponding HARQ-ACK information in the Type-2 HARQ-ACK codebook. When the DCI format indicates that the UE should provide the corresponding HARQ-ACK information (as determined in step 1120), the UE in step 1130 uses a value of a DAI field in the DCI format for the Type-2 HARQ-ACK codebook construction. Alternatively, when the DCI format does not indicate that the UE should provide the corresponding HARQ-ACK information (as determined in step 1120), the UE in step 1140 does not use a value of a DAI field in the DCI format for the Type-2 HARQ-ACK codebook construction.

In certain embodiments, when the UE is configured to provide HARQ-ACK information according to a Type-3 HARQ-ACK codebook (as described in REF 3), same or similar considerations apply as when the UE is configured to provide HARQ-ACK information according to a Type-1 HARQ-ACK codebook when a field enabling or disabling a HARQ-ACK information report is applicable to all HARQ processes indicated by the Type-3 HARQ-ACK codebook. A reason is that there is no purpose for a gNB (such as the BS 102) to trigger a Type-3 HARQ-ACK information report by the UE and disable such HARQ-ACK information report. When a field enabling or disabling a HARQ-ACK information report is applicable per HARQ process, then the field is a bit-map with size equal to the maximum number of HARQ processes that a DCI format can indicate for a HARQ-ACK information report by the UE using the Type-3 HARQ-ACK codebook.

Although FIG. 10 illustrates the method 1000 and the FIG. 11 illustrates the method 1100 various changes may be made to FIGS. 10 and 11. For example, while the method 1000 and the method 1100 are shown as a series of steps, various steps could overlap, occur in parallel, occur in a different order, or occur multiple times. In another example, steps may be omitted or replaced by other steps. For example, steps of the method 1000 and the method 1100 can be executed in a different order.

Embodiments of the present disclosure describe HARQ-ACK codebook construction for FDM PDSCH receptions in an active DL BWP of a serving cell. This is described in the following examples and embodiments, such as those of FIG. 12. That is, embodiments of this disclosure further considers a procedure to construct a HARQ-ACK codebook in response to FDM PDSCH reception in an active DL BWP.

Figure 12:
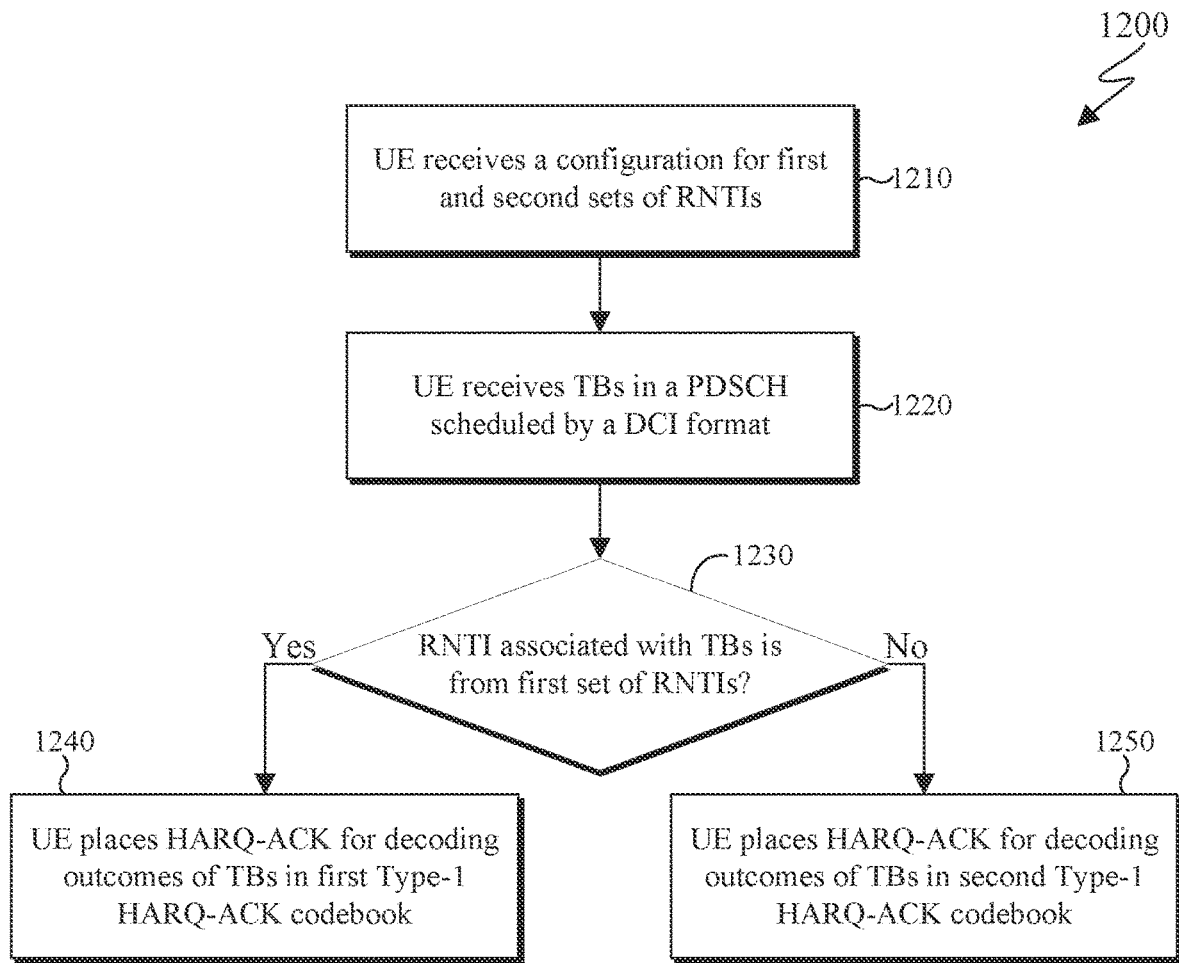
FIG. 12 illustrates a method for constructing Type-1 HARQ-ACK codebooks for PDSCH receptions in an active downlink (DL) bandwidth part (BWP) of a serving cell according to embodiments of present disclosure.

FIG. 12 illustrates a method 1200 for constructing Type-1 HARQ-ACK codebooks for PDSCH receptions in an active DL BWP of a serving cell according to embodiments of present disclosure. The steps of the method 1200 can be performed by any of the UEs 111-119 of FIG. 1, such as the UE 116 of FIG. 3. The method 1200 is for illustration only and other embodiments can be used without departing from the scope of the present disclosure.

In certain embodiments, a UE (such as the UE 116) configured for $N_{FDM}$ PDSCH receptions is also be configured $N_{FDM}$ sets of RNTIs. Here, the set of RNTIs includes one or more RNTIs and different sets of RNTIs do not include any common RNTIs. The RNTIs can be applicable for scrambling either or both the CRCs of the DCI format scheduling a PDSCH reception (or activating SPS PDSCH receptions) and the CRC of each TB provided by the PDSCH reception. Different sets of RNTIs can correspond to same or different services. For example, a C-RNTI can be associated with unicast data and a G-RNTI can be associated with groupcast data. For example, a first G-RNTI can be associated with a first groupcast service and a second G-RNTI can be associated with the first groupcast service or with a second groupcast service.

A Type-1 HARQ-ACK codebook construction is based on several configurations (such as those described in REF 3). For example, the configurations can include a set of slot timing values $K_1$ associated with the active UL BWP, a set of row indexes R of a table that is associated with the active DL BWP and defining respective sets of slot offsets $K_0$, start and length indicators SLIV, and PDSCH mapping types for PDSCH reception, on the ratio $2^{\mu_{DL}-\mu_{UL}}$ between the downlink SCS configuration $\mu_{DL}$ and the uplink SCS configuration $\mu_{UL}$ for the active DL BWP and the active UL BWP, respectively, and on TDD UL-DL configurations provided by higher layers. For PDSCH receptions in an active DL BWP, all configurations can be common to all PDSCH receptions or one or both of the configurations for the set of slot timing values or for the set of row indexes R can be separately provided and be associated with PDSCH receptions. For example, a first configuration can be associated with first RNTIs, such a C-RNTI or MCS-C-RNTI or CS-RNTI, and a second configuration can be associated with second RNTIs, such as G-RNTIs or G-CS-RNTIs. For example, a first configuration can be associated with a first G-RNTI and a second configuration can be associated with a second G-RNTI.

For a correct TB reception, the UE determines the Type-1 HARQ-ACK codebook to indicate a corresponding positive acknowledgement value (ACK) based on the set of RNTIs for an RNTI associated with the DCI format scheduling a corresponding PDSCH reception for an RNTI associated with the PDSCH reception. Remaining HARQ-ACK information bits in each Type-1 HARQ-ACK codebook have a NACK value.

For a Type-2 HARQ-ACK codebook, a value of a DAI field in a DCI format can be independently incremented per set of RNTIs and a UE constructs separately a HARQ-ACK codebook per set of RNTIs.

In certain embodiments, instead of configuring separate sets of RNTI for separate HARQ-ACK codebooks, a field in a DCI format can be used to indicate a HARQ-ACK codebook for HARQ-ACK information associated with the DCI format. A fallback DCI format, such as DCI format 1_0, can be always associated with a predetermined HARQ-ACK codebook such as a first HARQ-ACK codebook. A number of HARQ-ACK codebooks can be configured to be jointly or separately encoded and multiplexed in a same PUCCH or PUSCH, or a number of HARQ-ACK codebooks can be configured to be multiplexed in different PUCCHs or PUSCHs (and are then separately encoded).

The method 1200 of FIG. 12 illustrates an example procedure for constructing Type-1 HARQ-ACK codebooks for PDSCH receptions in an active DL BWP of a serving cell according to this disclosure.

In step 1210, a UE (such as the UE 116) receives a configuration for first and second sets of RNTIs, wherein a set of RNTIs includes one or more RNTIs and the first and second sets of RNTI do not have common RNTIs. The RNTIs scramble CRCs for one or both of DCI formats scheduling PDSCH receptions or TBs provided by the PDSCH receptions. In step 1220, the UE receives TBs in a PDSCH scheduled by a DCI format. In step 1230, the UE determines whether a RNTI associated with the TBs is from the first set of RNTIs or from the second set of RNTIs. When the RNTI is from the first set of RNTIs (as determined in step 1230), the UE in step 1240 places HARQ-ACK information bits corresponding to decoding outcomes for the TBs in a first Type-1 HARQ-ACK codebook. Alternatively, when the RNTI is not from the first set of RNTIs (as determined in step 1230), the UE in step 1250 places the HARQ-ACK information bits in a second Type-1 HARQ-ACK codebook.

Although FIG. 12 illustrates the method 1200 various changes may be made to FIG. 12. For example, while the method 1200 is shown as a series of steps, various steps could overlap, occur in parallel, occur in a different order, or occur multiple times. In another example, steps may be omitted or replaced by other steps. For example, steps of the method 1200 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
  receiving:
    first physical downlink control channels (PDCCHs) providing first downlink control information (DCI) formats associated with a first set of radio network temporary identifiers (RNTIs), the first set of RNTIs being associated with unicast communications, and
    second PDCCHs providing second DCI formats associated with a second set of RNTIs, the second set of RNTIs being associated with multicast communications;
  determining:
    first hybrid automatic request acknowledgement (HARQ-ACK) information associated with the first DCI formats,
    second HARQ-ACK information associated with the second DCI formats, and
    a physical uplink control channel (PUCCH) resource indicated by a last DCI format from the first DCI formats, wherein:
      the first DCI formats indicate a slot for transmission of a first PUCCH with the first HARQ-ACK information,
      the second DCI formats indicate the slot for transmission of a second PUCCH with the second HARQ-ACK information, and
      the last DCI format is provided in a PDCCH reception from the first PDCCH receptions that starts last among the first PDCCH receptions; and
  transmitting a PUCCH in the slot using the PUCCH resource, wherein the PUCCH includes the first HARQ-ACK information and the second HARQ-ACK information.

2. The method of claim 1, further comprising receiving:
  information for first PUCCH resource sets associated with the first set of RNTIs, and
  information for second PUCCH resource sets associated with the second set of RNTIs, wherein a PUCCH resource set includes a number of PUCCH resources.

3. The method of claim 1, wherein a DCI format from the second DCI formats includes:
  a first field providing a time domain resource allocation (TDRA), from a set of TDRAs, for an associated physical downlink shared channel (PDSCH) reception, and
  a second field providing a slot timing value, from a set of slot timing values, indicating the slot, wherein:
    the set of TDRAs is same for each DCI format from the second DCI formats, and
    the set of slot timing values is same for each DCI format from the second DCI formats.

4. The method of claim 1, wherein:
  the second set of RNTIs includes a first group RNTI (G-RNTI) and a second G-RNTI,
  the second HARQ-ACK information is determined according to a Type-1 HARQ-ACK codebook,
  a same set of slot timing values for determining slots of PUCCH transmissions is associated with both the first G-RNTI and the second G-RNTI, and
  a same set of time domain resource allocation (TDRA) values for determining symbols of physical downlink shared channel (PDSCH) receptions is associated with both the first G-RNTI and the second G-RNTI.

5. The method of claim 1, wherein:
  the second set of RNTIs includes a first group RNTI (G-RNTI) and a second G-RNTI,
  the second HARQ-ACK information is determined according to a Type-2 HARQ-ACK codebook, and
  the second HARQ-ACK information includes a first Type-2 HARQ-ACK codebook associated with the first G-RNTI and a second Type-2 HARQ-ACK codebook associated with the second G-RNTI.

6. The method of claim 1, further comprising encoding jointly the first HARQ-ACK information and the second HARQ-ACK information.

7. A user equipment (UE) comprising:
  a transceiver configured to receive:
    first physical downlink control channels (PDCCHs) providing first downlink control information (DCI) formats associated with a first set of radio network temporary identifiers (RNTIs), the first set of RNTIs being associated with unicast communications, and second PDCCHs providing second DCI formats associated with a second set of RNTIs, the second set of RNTIs being associated with multicast communications; and a processor operably coupled to the transceiver, the processor configured to determine:
first hybrid automatic request acknowledgement (HARQ-ACK) information associated with the first DCI formats,
second HARQ-ACK information associated with the second DCI formats, and
a physical uplink control channel (PUCCH) resource indicated by a last DCI format from the first DCI formats, wherein:
the first DCI formats indicate a slot for a transmission of a first PUCCH with the first HARQ-ACK information,
the second DCI formats indicate the slot for transmission of a second PUCCH with the second HARQ-ACK information, and
the last DCI format is provided in a PDCCH reception from the first PDCCH receptions that starts last among the first PDCCH receptions;
wherein the transceiver is further configured to transmit a PUCCH in the slot using the PUCCH resource, wherein the PUCCH includes the first HARQ-ACK information and the second HARQ-ACK information.

8. The UE of claim 7, wherein the transceiver is further configured to receive:
information for first PUCCH resource sets associated with the first set of RNTIs, and
information for second PUCCH resource sets associated with the second set of RNTIs, wherein a PUCCH resource set includes a number of PUCCH resources.

9. The UE of claim 7, wherein a DCI format from the second DCI formats includes:
a first field providing a time domain resource allocation (TDRA), from a set of TDRAs, for an associated physical downlink shared channel (PDSCH) reception, and
a second field providing a slot timing value, from a set of slot timing values, indicating the slot, wherein:
the set of TDRAs is same for each DCI format from the second DCI formats, and
the set of slot timing values is same for each DCI format from the second DCI formats.

10. The UE of claim 7, wherein:
the second set of RNTIs includes a first group RNTI (G-RNTI) and a second G-RNTI,
the second HARQ-ACK information is determined according to a Type-1 HARQ-ACK codebook,
a same set of slot timing values for determining slots of PUCCH transmissions is associated with both the first G-RNTI and the second G-RNTI, and
a same set of time domain resource allocation (TDRA) values for determining symbols of physical downlink shared channel (PDSCH) receptions is associated with both the first G-RNTI and the second G-RNTI.

11. The UE of claim 7, wherein:
the second set of RNTIs includes a first group RNTI (G-RNTI) and a second G-RNTI,
the second HARQ-ACK information is determined according to a Type-2 HARQ-ACK codebook, and
the second HARQ-ACK information includes a first Type-2 HARQ-ACK codebook associated with the first G-RNTI and a second Type-2 HARQ-ACK codebook associated with the second G-RNTI.

12. The UE of claim 7, further comprising an encoder configured to jointly encode the first HARQ-ACK information and the second HARQ-ACK information.

13. A base station comprising:
a transceiver configured to transmit:
first physical downlink control channels (PDCCHs) providing first downlink control information (DCI) formats associated with a first set of radio network temporary identifiers (RNTIs), the first set of RNTIs being associated with unicast communications, and
second PDCCHs providing second DCI formats associated with a second set of RNTIs, the second set of RNTIs being associated with multicast communications; and
a processor operably coupled to the transceiver, the processor configured to determine a physical uplink control channel (PUCCH) resource indicated by a last DCI format from the first DCI formats, wherein:
the first DCI formats indicate a slot for reception of a first PUCCH with first hybrid automatic request acknowledgement (HARQ-ACK) information,
the second DCI formats indicate the slot for reception of a second PUCCH with second HARQ-ACK information, and
the last DCI format is provided in a PDCCH transmission from the first PDCCH transmissions that starts last among the first PDCCH transmissions;
wherein the transceiver is further configured to receive the PUCCH in the slot using the PUCCH resource, wherein the PUCCH includes the first HARQ-ACK information associated with the first DCI formats and the second HARQ-ACK information associated with the second DCI formats.

14. The base station of claim 13, wherein the transceiver is further configured to transmit:
information for first PUCCH resource sets associated with the first set of RNTIs, and
information for second PUCCH resource sets associated with the second set of RNTIs, wherein a PUCCH resource set includes a number of PUCCH resources.

15. The base station of claim 13, wherein a DCI format from the second DCI formats includes:
a first field providing a time domain resource allocation (TDRA), from a set of TDRAs, for an associated physical downlink shared channel (PDSCH) transmission, and
a second field providing a slot timing value, from a set of slot timing values, indicating the slot, wherein:
the set of TDRAs is same for each DCI format from the second DCI formats, and
the set of slot timing values is same for each DCI format from the second DCI formats.

16. The base station of claim 13, wherein:
the second set of RNTIs includes a first group RNTI (G-RNTI) and a second G-RNTI,
the second HARQ-ACK information is determined according to a Type-1 HARQ-ACK codebook,
a same set of slot timing values for determining slots of PUCCH receptions is associated with both the first G-RNTI and the second G-RNTI, and
a same set of time domain resource allocation (TDRA) values for determining symbols of physical downlink shared channel (PDSCH) transmissions is associated with both the first G-RNTI and the second G-RNTI.

17. The base station of claim 13, wherein:
the second set of RNTIs includes a first group RNTI (G-RNTI) and a second G-RNTI, the second HARQ-ACK information is determined according to a Type-2 HARQ-ACK codebook, and the second HARQ-ACK information includes a first Type-2 HARQ-ACK codebook associated with the first G-RNTI and a second Type-2 HARQ-ACK codebook associated with the second G-RNTI.

\* \* \* \* \*